3,077,435
THERAPEUTIC COMPOSITION COMPRISING 4-(2-DIMETHYLAMINOETHOXY)-4-(3,4,5 - TRIMETHOXYBENZOYL) - BENZYLAMINE AND BETA-PYRIDYLCARBINOL
Louis Magid, Clifton, Virginius Dante Mattia, Jr., Nutley, and John James Vance, Park Ridge, N.J., assignors to Hoffmann-La Roche Inc., Nutley, N.J., a corporation of New Jersey
No Drawing. Filed July 27, 1961, Ser. No. 127,150
6 Claims. (Cl. 167—65)

The present invention relates to therapeutic compositions. More particularly, the present invention relates to therapeutic compositions containing trimethobenzamide and β-pyridyl carbinol.

The present compositions are useful for the relief of the symptoms of vertigo with nausea and/or vomiting which occurs in a number of clinical conditions of varying etiology. They are useful adjuncts in the management of labyrinthine dysfunction of vascular origin. For example, the instant composition have been found to be useful for the relief of vertigo due to cerebral arteriosclerosis and otosclerosis. They are particularly useful in the treatment of Ménière's syndrome, especially for relief of the acute vertiginous crisis; and for the treatment of Ménière's disease. Additionally, when tinnitus is present prior to therapy, this symptom is also noticeably improved by the administration of the compositions of the invention.

The method of treating a human being having vertigo with nausea and/or vomiting, e.g. suffering from Ménière's syndrome or disease, comprises treating a human being so afflicted with a composition containing trimethobenzamide, or a pharmaceutically acceptable salt thereof, and β-pyridyl carbinol, or a pharmaceutically acceptable salt thereof. The ratio of ingredients can vary over wide ranges, e.g. from 5 to 300, preferably 20 to 75% by weight of β-pyridyl carbinol can be employed, based on the weight of trimethobenzamide.

The salts of trimethobenzamide (4-[2-dimethylaminoethoxy]-N-[3,4,5-trimethoxybenzoyl]benzylamine) that can be employed are those salts prepared with pharmaceutically acceptable acids such as HCl, HBr, $H_2SO_4$, tartaric acid, citric acid, etc., with the hydrochloride salt being preferred.

The β-pyridyl carbinol can be employed as such or in the form of a salt with pharmaceutically acceptable acids such as the above, preferably the tartrate.

The compositions of the invention are prepared by mixing together the two active components and, optionally, pharmaceutical adjuvants, and forming the resulting mixtures into suitable dosage forms. Compositions suitable for oral administration are the known pharmaceutical forms for such administration, e.g. pressed or coated tablets, capsules, syrups, and aqueous solutions or oily suspensions, and the pharmaceutical adjuvants used in the production of these formulations are those well known to the pharmacist's art, as are also the means of formulation. Suitable oral compositions include tablets wherein the active ingredients are mixed with inert fillers, e.g. calcium carbonate or lactose in the presence of disintegrating agents, for example, maize starch, and lubricating agents, for example, magnesium stearate.

Aqueous solutions for oral use are formulated by incorporating the active ingredients in pharmaceutically acceptable liquid media. The liquid media can contain, for example, a pharmaceutically acceptable thickening agent, e.g. sodium carboxymethylcellulose, and/or pharmaceutically acceptable sweetening and flavoring agents. Oily suspensions for oral use may be formulated in a suitable vegetable oil, for example, arachis oil which may contain suitable sweetening agents and preservatives.

Compositions suitable for parenteral administration are the known pharmaceutical forms for such administration, for example sterile aqueous solutions or suspensions in oily media. The pharmaceutical adjuvants used in these formulations are those well known to the pharmacist's art, as are also the means of formulation.

The sterile aqueous solutions for parenteral administration may be formulated in the presence of parenterally-acceptable buffers, e.g. sodium citrate, citric acid, sodium phosphate, and/or preservatives, e.g. phenol, methyl and propyl esters of p-hydroxybenzoic acid. Suitable injectable oily preparations may be prepared by dispersing the active ingredients in an oily medium, for example, a vegetable oil, e.g. arachis oil, which is known to be non-toxic and parenterally-acceptable.

The active ingredients of the invention can also be used in rectal suppository form by mixing them with suppository adjuvant materials, e.g. fatty acid esters of glycerine or glycols e.g. cocoa butter, propylene glycol monostearate, etc., by techniques well known to the art.

A typical dosage of active ingredients ranges from about 50 to about 500 mg., preferably from about 100 to about 250 mg. of trimethobenzamide, and from about 25 to about 150, preferably from about 50 to about 100 mg. of β-pyridyl carbinol. For example, one or two hard-shell capsules containing, as active ingredients, 100 mg. of trimethobenzamide hydrochloride, and 50 mg. of β-pyridyl carbinol in the form of its tartrate salt are administered to a patient three times daily. However, these ranges are not critical and dosages outside these ranges can be employed.

In the compositions of the invention the active ingredients are normally employed in the form of their acid addition salts with pharmaceutically acceptable acids. However, in some formulations it is advantageous to employ the free base of one of the active ingredients.

The following examples are given to illustrate and not limit the invention.

*Example 1*

101 mg. of trimethobenzamide hydrochloride, 120 mg. of β-pyridyl carbinol tartrate, 18.8 mg. of U.S.P. starch, and 5.0 mg. of U.S.P. magnesium stearate are blended together in a stainless steel container. After the powders are thoroughly mixed, the mixture is passed through a comminuting machine and then inserted into a hard-shelled gelatin capsule.

*Example 2*

100 mg. of trimethobenzamide hydrochloride, 50 mg. of β-pyridyl carbinol, 1.8 mg. of methyl-p-hydroxybenzoate, 0.2 mg. of propyl-p-hydroxybenzoate, 0.5 mg. of sodium citrate, and 0.2 mg. of citric acid are added to water, the above amounts being the amounts added per ml. of water. The pH of the solution is adjusted to 5.0 with hydrochloric acid. The solution is filtered and filled into glass ampules which are sealed and heat-sterilized at 10 lbs. pressure for ½ hour. The resulting aqueous solution is suitable for parenteral injection.

*Example 3*

The composition of Example 2 is made up except that 60 mg. of β-pyridyl carbinol tartrate is employed instead of 50 mg. of β-pyridyl carbinol; and the solution is adjusted to pH 5 with sodium hydroxide.

*Example 4*

100 mg. of trimethobenzamide hydrochloride, 120 mg. of β-pyridyl carbinol tartrate, 0.45 mg. of phenol, 0.5 mg. of sodium citrate, and 0.2 mg. of citric acid are mixed with water, the quantities given being based on 1 ml. of water. The pH of the solution is adjusted to 5.0 with sodium hydroxide, and the solution is filtered, filled in glass ampules, sealed and heat-sterilized at 10 lbs. pressure for ½ hour. The resulting solution is suitable for parenteral use.

Example 5

200 mg. of trimethobenzamide hydrochloride, 250 mg. of β-pyridyl carbinol tartrate, 38.45 mg. of white beeswax, 96.1 mg. of polyoxyethylene sorbitan mono-oleate (Tween 80), and 1105.45 mg. of propyleneglycol monostearate are mixed together, heated, and shaped in the form of a rectal suppository.

Example 6

The formulation of Example 5 is repeated except that 500 mg. of β-pyridyl carbinol tartrate is employed; and 30 mg. of ethylaminobenzoate is added to the mixture as an additional ingredient.

Variations in the process and compositions of the invention can be undertaken by those skilled in the art without departing from either the scope or spirit of the invention.

We claim:

1. A therapeutic composition comprising 4-(2-dimethylaminoethoxy)-N-(3,4,5 - trimethoxybenzoyl)benzylamine, from about 5% to about 300% by weight of β-pyridyl carbinol based on the weight of 4-(2-dimethylaminoethoxy)-N-(3,4,5-trimethoxybenzoyl)benzylamine, and a pharmaceutically acceptable carrier.

2. A composition of claim 1 wherein the β-pyridyl carbinol is in the form of a salt with a pharmaceutically acceptable acid.

3. A composition of claim 2 wherein the 4-(2-dimethylaminoethoxy)-N-(3,4,5 - trimethoxybenzoyl)benzylamine is in the form of an acid addition salt with a pharmaceutically acceptable acid.

4. The composition of claim 3 wherein the salt of 4-(2-dimethylaminoethoxy)-N-(3,4,5 - trimethoxybenzoyl)benzylamine is the hydrochloride salt, and the salt of β-pyridyl carbinol is the tartrate salt.

5. A process for treating a human being having acute vertigo comprising internally administering to said human being a therapeutic composition comprising 4-(2-dimethylaminoethoxy) - N - (3,4,5 - trimethoxybenzoyl)benzylamine, from about 5% to about 300% by weight of β-pyridyl carbinol based on the weight of 4-(2-dimethylaminoethoxy)-N-(3,4,5 - trimethoxybenzoyl)benzylamine, and a pharmaceutically acceptable carrier.

6. A process for treating a human being afflicted with Ménière's disease comprising internally administering to said human being a therapeutic composition comprising 4-(2-dimethylaminoethoxy)-N-3,4,5 - trimethoxybenzoyl)benzylamine, from about 5% to about 300% by weight of β-pyridyl carbinol based on the weight of 4-(2-dimethylaminoethoxy) - N - (3,4,5-dimethoxybenzoyl)benzylamine, and a pharmaceutically acceptable carrier.

References Cited in the file of this patent

UNITED STATES PATENTS 2,879,293    Goldberg _____ Mar. 24, 1959

OTHER REFERENCES

Conn: Current Therapy, 1960, pp. 546–7. Copy in Division 43.

Physicians' Desk Reference, January 1961, p. 712. Copy in Division 43.